March 8, 1927.
J. C. REINKE, JR
1,620,288
SUPPORTING DEVICE
Filed March 27, 1925
2 Sheets-Sheet 1
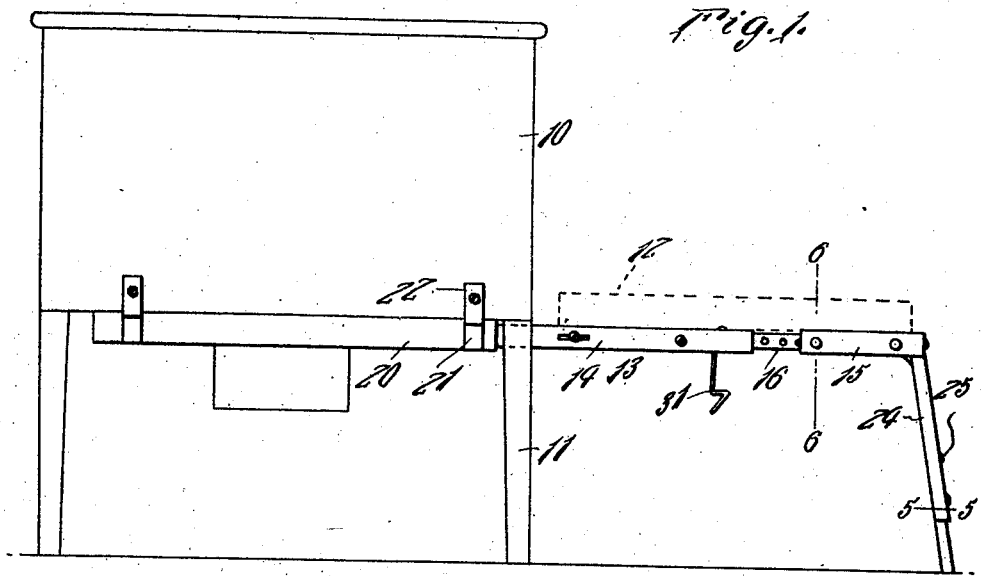
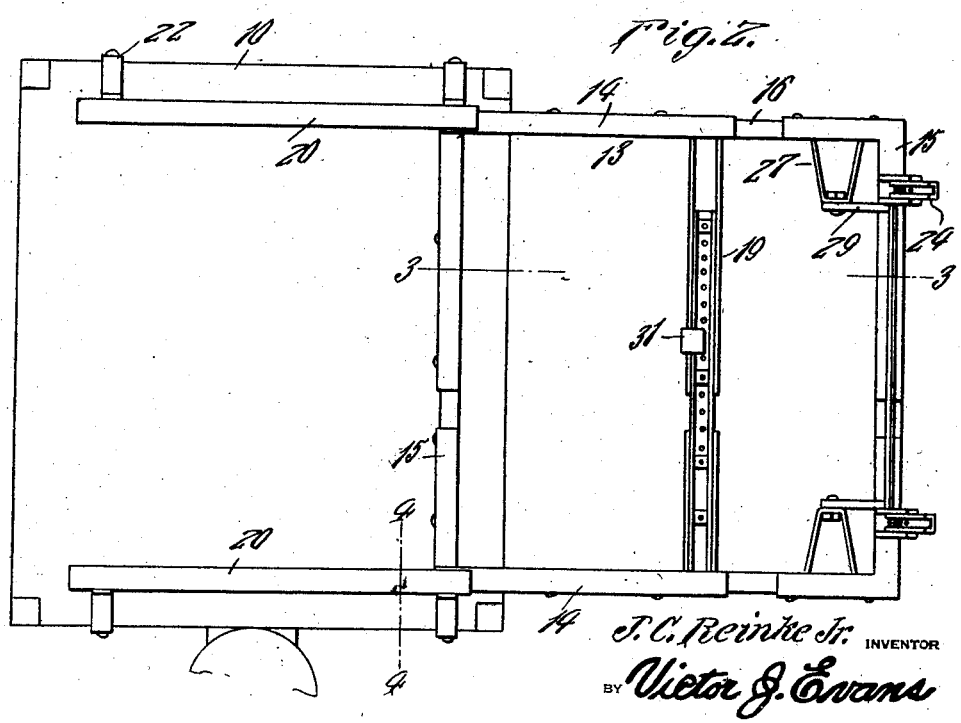
J. C. Reinke Jr. INVENTOR
BY Victor J. Evans
ATTORNEY March 8, 1927.
J. C. REINKE, JR
SUPPORTING DEVICE
Filed March 27, 1925 2 Sheets-Sheet 2
1,620,288
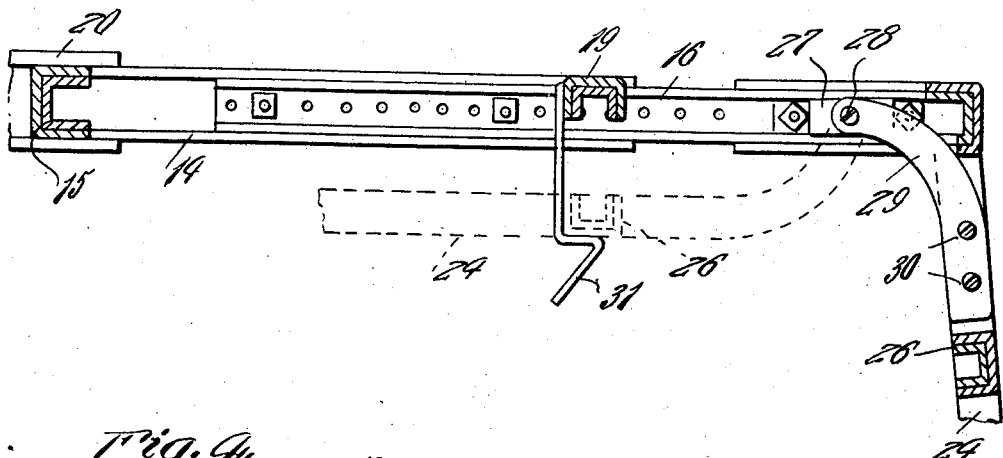
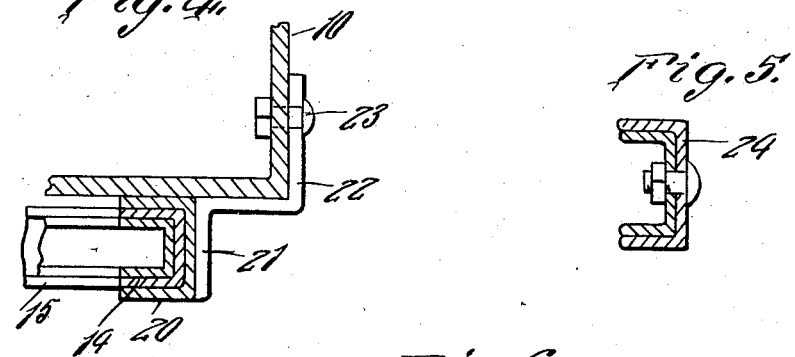
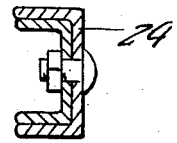
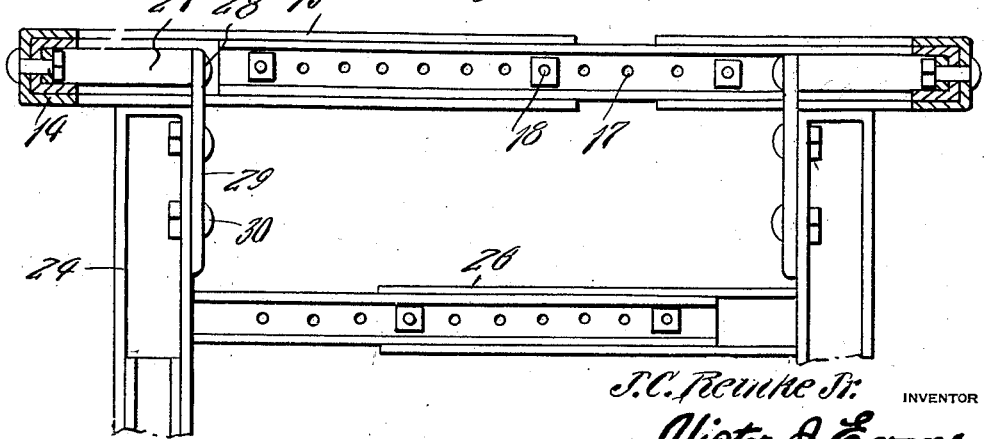

Patented Mar. 8, 1927.

1,620,288

UNITED STATES PATENT OFFICE.

JOHN C. REINKE, JR., OF PULASKI, WISCONSIN.

SUPPORTING DEVICE.

Application filed March 27, 1925. Serial No. 18,876.

This invention relates to supporting devices and has particular relation to means for supporting trays of incubators to facilitate the handling of eggs.

An object of the present invention is the provision of a frame which may be attached to an incubator in such manner as to permit of its being normally housed beneath said incubator or pulled outward to provide a tray support.

Another object of the invention is the provision of a device of the above character which may be adjusted to suit the height and size of an incubator and readily and securely attached thereto.

With the above and other objects in view, the invention further includes the following novel features and details of construction, to be hereinafter more fully described, illustrated in the accompanying drawings and pointed out in the appended claims.

In the drawings:—

Figure 1 is a side elevation showing an incubator or other leg supported receptacle with the tray supporting frame attached and shown in extended position.

Figure 2 is a bottom plan view of the same.

Figure 3 is an enlarged fragmentary sectional view taken substantially on the line 3—3 of Figure 2 with the incubator omitted.

Figure 4 is an enlarged fragmentary section taken substantially on the line 4—4 of Figure 2.

Figure 5 is an enlarged section taken substantially on the line 5—5 of Figure 1.

Figure 6 is an enlarged transverse sectional view on the line 6—6 of Figure 1.

Referring to the drawings in detail wherein like characters of reference denote corresponding parts, the reference character 10 indicates an incubator which is supported in the usual manner upon legs 11 and which is provided with egg holding trays 12 indicated by dotted lines in Figure 1. It may be here stated that while the supporting device is illustrated and described in connection with an incubator, it may be used in various other capacities and it is not the purpose of the present application to limit the invention to this particular use.

The supporting device comprises a frame which is indicated generally at 13 and which includes side members 14 and end members 15. Both the side and end members are of sectional formation and include end sections which are adjustably connected by intermediate sections 16. The sections of both the side and end members are preferably formed of channel iron and are provided with spaced openings 17 for the passage of bolts 18, by means of which the sections are adjustably connected and the sides of the frame regulated. The frame further includes a transverse member 19 which connects the side members 14 and which is also of sectional formation, being constructed in a similar manner to the side and end members so as to permit of adjustment.

The side members 14 of the frame are slidingly mounted in channel-shaped tracks 20 which are secured beneath the bottom of the incubator 10. For this purpose the tracks 20 are secured to the lower inner ends 21 of substantially Z-shaped brackets 23, the upper outer ends of these brackets being bolted or otherwise secured to the sides of the incubator as indicated at 23. The tracks 20 may thus be conveniently attached beneath the incubator and the frame adjusted so as to permit of free sliding movement within the tracks.

The frame is normally housed beneath the incubator and is adapted to be moved outward or extended for the purpose of supporting the trays 12 and in order to support the outer end of the frame there is provided legs 24. These legs are also of sectional formation with the sections adjustably connected by bolts 25 or the like so that the length of the legs may be regulated in accordance with the height of the incubator. The legs are connected by adjustable braces 26.

For the purpose of securing the legs to the frame and of spacing them inwardly from the side members 14 so as to permit the legs to be folded upward beneath the frame, the said side members have extending inwardly therefrom substantially V-shaped brackets 27. Pivotally secured to these brackets as shown at 28 are the upper ends of curved bars 29. The lower ends of these bars are rigidly secured to the upper ends of the legs 24 as shown at 30, so that the upper extremities of the legs will abut the under face of the outer end bar 15 so as to provide a substantial support when the legs are extended, or will permit of the legs being folded upward beneath the frame as indicated by the dotted lines in Figure 3 of the drawings. Secured to and extending downwardly from the intermediate member 19 is a spring latch 31. This latch is so positioned that when the legs are swung upward it will be engaged by the brace 26 to hold the legs in raised position.

The invention is susceptible of various changes in its form, proportions and minor details of construction and the right is herein reserved to make such changes as properly fall within the scope of the appended claims.

Having described the invention what is claimed is:—

1. A tray supporting device of the character described comprising a frame mounted for sliding movement, and including extensible side and end members, an intermediate extensible member connecting the side members, extensible legs for supporting one end of the frame, oppositely located brackets extending inwardly from the side members near one end of the frame, curved connecting bars having their ends pivotally secured to the brackets and their other ends secured to the upper ends of the legs to permit said legs to be folded inwardly or extended with their upper ends engaging the end members of the frame, and means detachably engaging the legs to hold the legs folded.

2. A tray supporting device of the character described comprising a frame mounted for sliding movement, and including extensible side and end members, an intermediate extensible member connecting the side members, extensible legs for supporting one end of the frame, oppositely located brackets extending inwardly from the side members near one end of the frame, curved connecting bars having their ends pivotally secured to the brackets and their other ends secured to the upper ends of the legs to permit said legs to be folded inwardly or extended with their upper ends engaging the end members of the frame, and a spring latch extending downward from the intermediate member for detachable engagement with the legs to hold the legs folded.

In testimony whereof I affix my signature.

JOHN C. REINKE, Jr.